H. AUSTIN.
WHEEL CASTER.
APPLICATION FILED MAY 10, 1919.

1,343,758.

Patented June 15, 1920.

UNITED STATES PATENT OFFICE.

HERBERT AUSTIN, OF BROMSGROVE, ENGLAND.

WHEEL-CASTER.

1,343,758.  Specification of Letters Patent.  Patented June 15, 1920.

Application filed May 10, 1919. Serial No. 296,140.

*To all whom it may concern:*

Be it known that I, HERBERT AUSTIN, a subject of the King of Great Britain, and residing at Bromsgrove, in the county of Worcester, England, have invented certain new and useful Improvements in Wheel-Casters, of which the following is a specification.

This invention relates to a caster which will run, in a reverse direction from that in which it has last run, without needing to swing for such purpose about the caster axis, from its position for running in one direction into its reverse position, and has for its object to provide means of an improved character for insuring such reversal.

A caster constructed according to this invention has the caster wheel pivoted in a bracket, or fork, which is pivoted at a point above the wheel axis, by a horizontal pivot, to a member which can turn about the caster axis, and means are provided whereby the vibration of the bracket or fork about its horizontal pivot axis is limited in either direction.

The invention is more particularly described with reference to the drawings herewith, of which:—

Figures 1, 2:
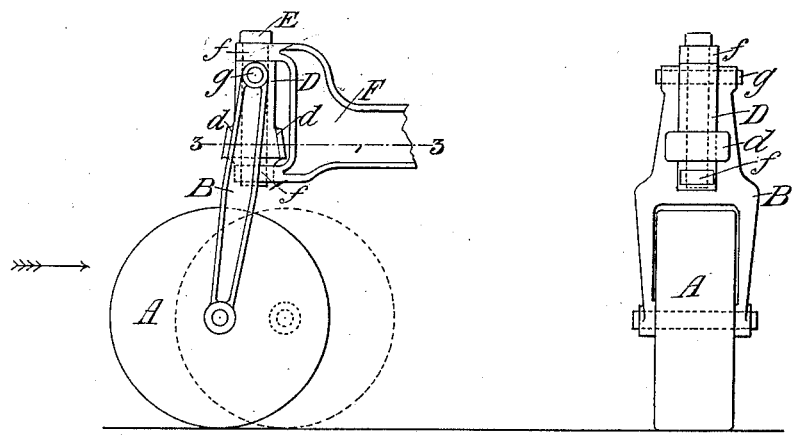
Figure 1 is a side elevation of a caster constructed according to this invention.
Fig. 2 is a view of the caster shown by Fig. 1, as seen looking in the direction of the arrow of such figure; and, Fig. 3 is a sectional plan taken on line 3 3 of Fig. 1.
Figure 3:
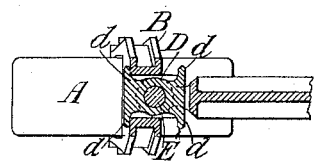

A is the wheel of the caster and D a member which is pivoted by means of a vertical pin E, the axis of which constitutes the caster axis, between upper and lower jaws *f* of the frame F of the carriage (or other structure) which the caster supports. This member D can consequently be turned about the axis of the pin E. To the upper end of the member D is pivoted, such as by means of a horizontal pin *g* which passes through the pin E, the upper end of a fork B, within the lower end of which the wheel A is mounted. The fork B may thus turn, with the member D, about the axis of the pin E, and the fork may also turn about the axis of the pin *g*. Stops *d* are formed with the member D to limit the distance to which the fork B can turn in either direction about the axis of the pin *g*. When the carriage (or other structure) which the caster supports is run in one direction, the fork B is against what are then the backward stops *d* of the member D and itself slants backward from the vertical, with the wheel A in the position, say, which is indicated by full line circle, Fig. 1, and then the caster functions, as such, for that direction of travel of the carriage. When the carriage is then run in the opposite direction, the fork B comes against the other stops *d* of the member D, the fork then slanting in the opposite direction from the vertical to that in which it previously slanted, the wheel A being then in the position indicated by broken line circle, Fig. 1, and the caster then functions, as such, for that direction of travel of the carriage.

It will be seen that as the fork B moves from one position in relation to the vertical caster axis, into the reverse or opposite position, it will slightly raise the carriage or other structure, and then allow it to move down again to its normal position.

Having fully described my invention, what I claim and desire to secure by Letters Patent, is:—

1. The combination, in a caster, of a member which can turn about the vertical caster axis, a bracket in which the caster wheel is pivoted, said bracket pivoted by a horizontal pivot axis, at a point above the wheel axis, to said member which can turn about the caster axis, and means to limit the vibrations of said bracket about its horizontal pivot axis in either direction.

2. The combination, in a caster, of a member which can turn about the vertical caster axis, a bracket in which the caster wheel is pivoted, said bracket pivoted by a horizontal pivot axis, at a point above the wheel axis, to said member which can turn about the caster axis, and stops to limit the vibrations of said bracket about its horizontal pivot axis in either direction.

3. The combination, in a caster, of a member which can turn about the vertical caster axis, a bracket in which the caster wheel is pivoted, said bracket pivoted by a horizontal pivot axis, at a point above the wheel axis, to said member which can turn about the caster axis, and stops on the member which can turn about the caster axis, with one or other of which stops the said bracket engages, and by which its vibration in either direction is limited.

In witness whereof I have hereunto signed my name this 25th day of April, 1919, in the presence of two subscribing witnesses.

HERBERT AUSTIN.

Witnesses:
ALBERT HILLIARD,
OLGA PENDERED.